US007909489B2

(12) United States Patent
Lin et al.

(10) Patent No.: US 7,909,489 B2
(45) Date of Patent: Mar. 22, 2011

(54) LED ROAD LAMP HOLDER STRUCTURE

(75) Inventors: Kuo-Len Lin, Wugu Township, Taipei County (TW); Chen-Hsiang Lin, Wugu Township, Taipei County (TW); Hwai-Ming Wang, Wugu Township, Taipei County (TW); Chiao-Li Huang, Wugu Township, Taipei County (TW); Ken Hsu, Wugu Township, Taipei County (TW); Chih-Hung Cheng, Wugu Township, Taipei County (TW)

(73) Assignees: Cpumate Inc, Taipei County (TW); Golden Sun News Techniques Co., Ltd., Taipei County (TW)

( * ) Notice: Subject to any disclaimer, the term of this patent is extended or adjusted under 35 U.S.C. 154(b) by 199 days.

(21) Appl. No.: 12/400,282

(22) Filed: Mar. 9, 2009

(65) Prior Publication Data

US 2010/0226138 A1 Sep. 9, 2010

(51) Int. Cl.
*B60Q 1/06* (2006.01)

(52) U.S. Cl. ... 362/373; 362/294; 362/547; 362/249.02; 362/240; 362/345

(58) Field of Classification Search .................. 362/373, 362/294, 547, 249.02, 240, 345
See application file for complete search history.

(56) References Cited

U.S. PATENT DOCUMENTS

| | | | | |
|---|---|---|---|---|
| 7,722,221 | B2 * | 5/2010 | Chae | 362/294 |
| 2006/0007013 | A1 * | 1/2006 | Singer et al. | 340/815.45 |
| 2007/0189012 | A1 * | 8/2007 | Huang et al. | 362/294 |
| 2008/0055908 | A1 * | 3/2008 | Wu et al. | 362/294 |

* cited by examiner

*Primary Examiner* — Evan Dzierzynski
(74) *Attorney, Agent, or Firm* — Chun-Ming Shih; HDLS IPR Services

(57) ABSTRACT

A road lamp holder structure includes a lamp guard (1), an LED unit (2) installed at the bottom of the lamp guard (1), and a heat dissipating device (30) installed in lamp guard (1) and having a base (30), a vapor chamber (31) and two heat dissipating elements (32) attached to the LED unit (2). The vapor chamber (31) includes a heated section (310) attached onto the base (30), two heat transmitting sections (311) bent and extended upward from both sides of the heated section (310) respectively, a condensing section (312) bent and extended laterally from each of the two heat transmitting sections (311), two heat dissipating elements (32) having a heated base (30), and heat dissipating fins (321) disposed on the heated base (30). The two heated bases (30) are attached onto external sides of the two heat transmitting sections (311) of the vapor chamber (31) respectively, and the two condensing sections (312) of the vapor chamber (31) are attached to the internal periphery of the top of the lamp guard (1).

12 Claims, 6 Drawing Sheets

LED ROAD LAMP HOLDER STRUCTURE

BACKGROUND OF THE INVENTION

1. Field of the Invention

The present invention relates to a light emitting diode (LED) lamp, and more particularly to an LED road lamp holder structure.

2. Description of Prior Art

Light emitting diode (LED) is used extensively as a light source for lamps, but LED is one of the electronic components with waterproof and dust-resisting issues when the LED is used as an outdoor lamp. Furthermore, it is necessary to take the heat dissipation into consideration.

At present, a conventional heat sink or heat dissipating device used in a computer system is mainly used as the heat dissipating structure in an LED road lamp holder, but none has a lamp holder with an enhanced heat dissipating effect. Unlike computer systems, the LED road lamp holder has an internal structure in contact with a heated portion, and thus it is an important subject for LED lamp manufacturers to improve the heat dissipating device in conformity with the internal structure of the LED road lamp holder, so as to enhance the heat dissipating effect of the LED lamps.

In view of the foregoing shortcomings of the prior art, the inventor of the present invention based on years of experience in the related industry to conduct extensive researches and experiments, and finally developed an improved LED road lamp holder in accordance with the present invention to enhance the heat dissipating effect of the road lamps.

SUMMARY OF THE INVENTION

It is a primary objective of the present invention to provide an LED road lamp holder structure, wherein a heat source of the LED road lamp holder is generally situated at the bottom of a lamp guard structure for dissipating the produced heat to the top of the lamp guard which is situated at a position away from the heat source, and the lamp guard is used for discharging the heat to the outside to enhance the heat dissipating effect.

To achieve the foregoing objective, the present invention provides an LED road lamp holder structure, comprising a lamp guard, an LED unit, and a heat dissipating device, wherein the LED unit is installed at the bottom of the lamp guard, and the heat dissipating device is installed in the lamp guard and includes a base attached onto the LED unit, a vapor chamber and two heat dissipating elements, and the vapor chamber has a heated section attached to the base, two heat transmitting sections bent and extended upward to both sides of the heated section respectively, a cooling section bent and extended laterally and separately from the two heat transmitting sections, two heat dissipating elements, each having a heated base, and a plurality of heat dissipating fins disposed on the heated base, and the two heated bases attached onto external sides of the two heat transmitting sections of the vapor chamber respectively, and two cooling sections of the vapor chamber attached to the internal periphery of the top of the lamp guard.

The present invention can conduct a portion of the heat produced by the LED unit to the two heat dissipating elements through the vapor chamber of the heat dissipating device, and the remaining portion of the heat can be discharged from the lamp guard to the outside by the attaching the two cooling sections of the vapor chamber with the internal periphery of the top of the lamp guard, so as to enhance the heat dissipating effect.

DETAILED DESCRIPTION OF THE INVENTION

The technical characteristics, features and advantages of the present invention will become apparent in the following detailed description of preferred embodiments with reference to the accompanying drawings, and the preferred embodiments are used for illustrating the present invention only, but not intended to limit the scope of the invention.

Figure 1:
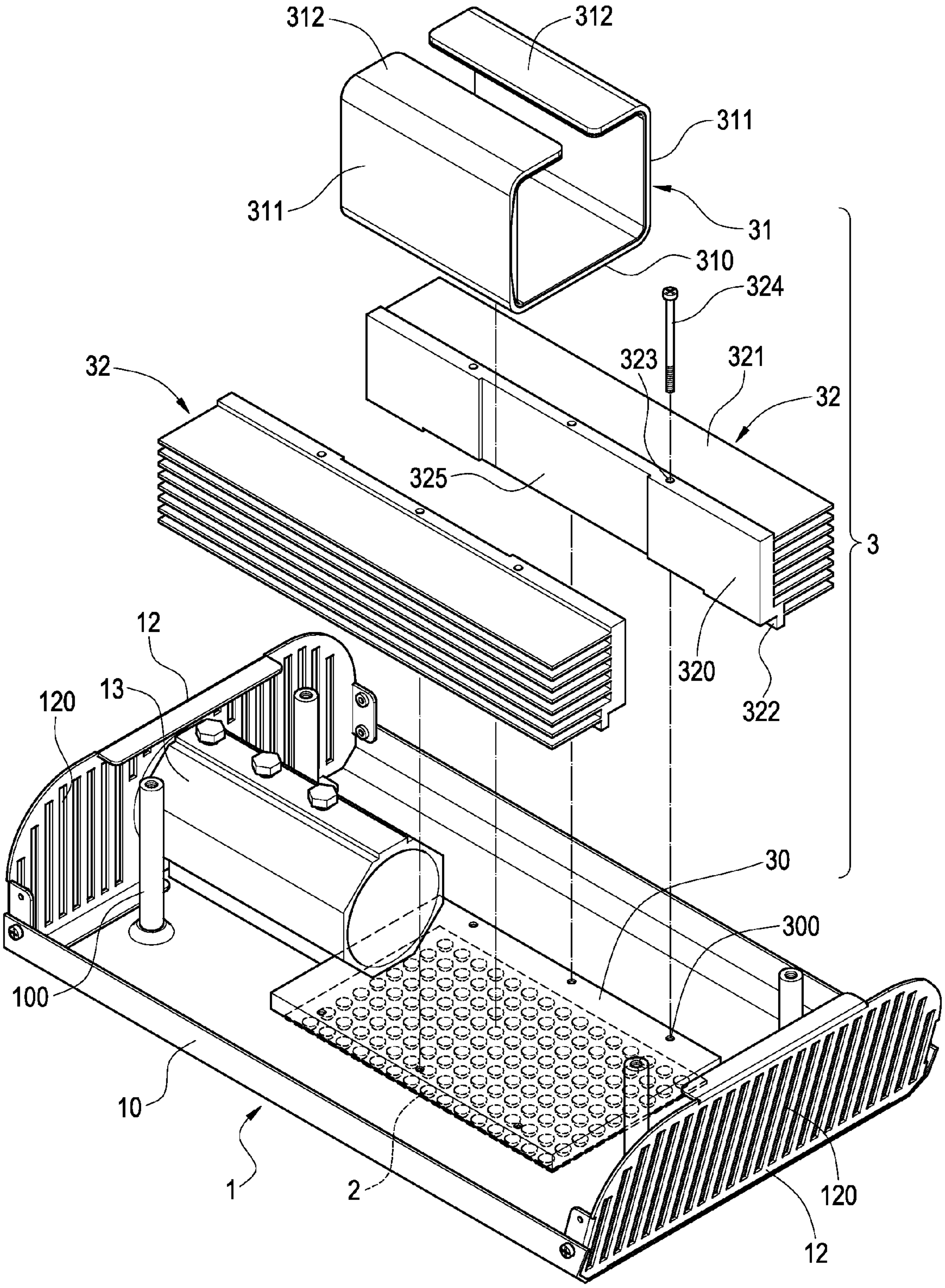
FIG. 1 is an exploded view of the internal assembly of the present invention.
Figure 2:
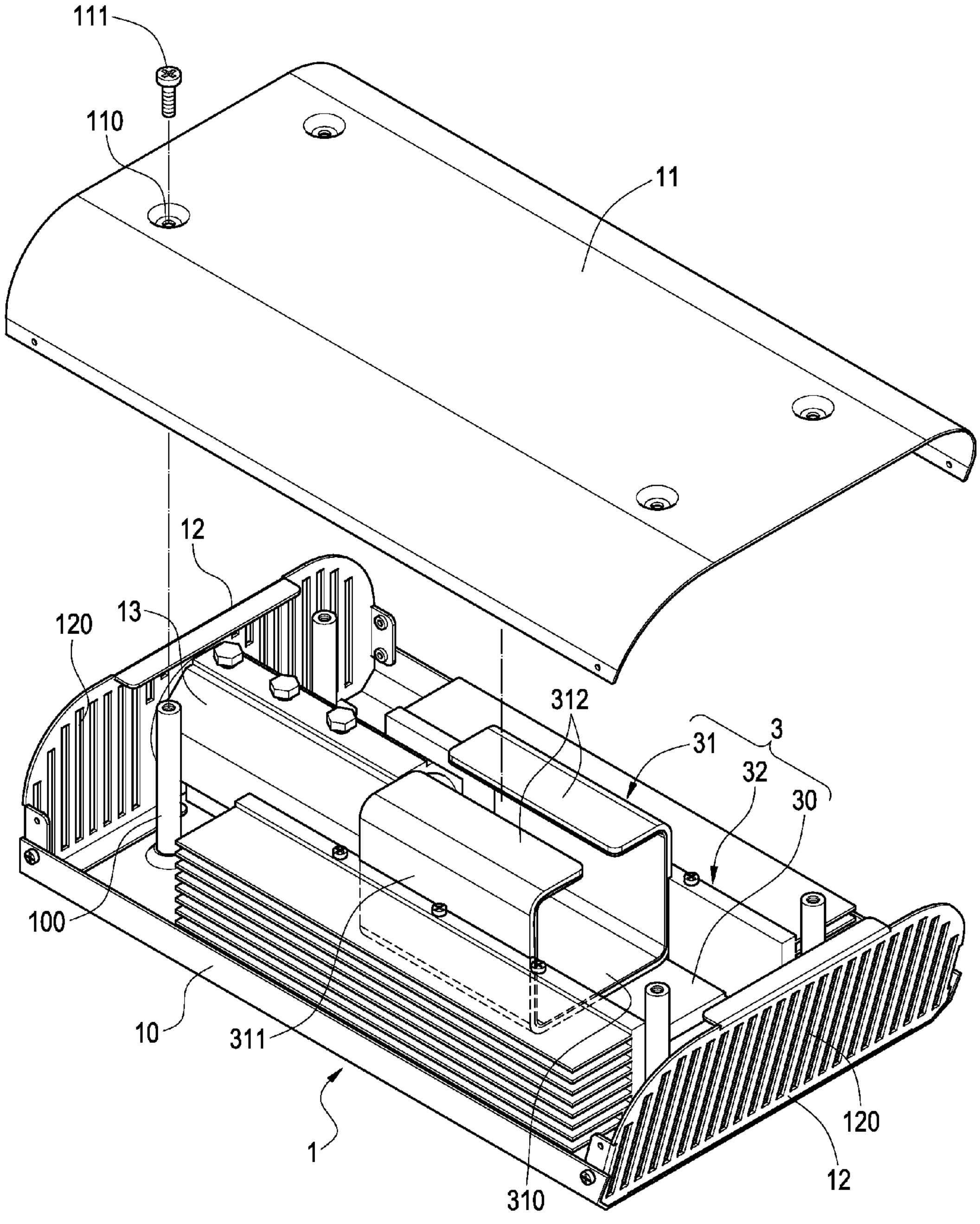
FIG. 2 is a perspective view of the internal assembly of the present invention.
Figure 3:
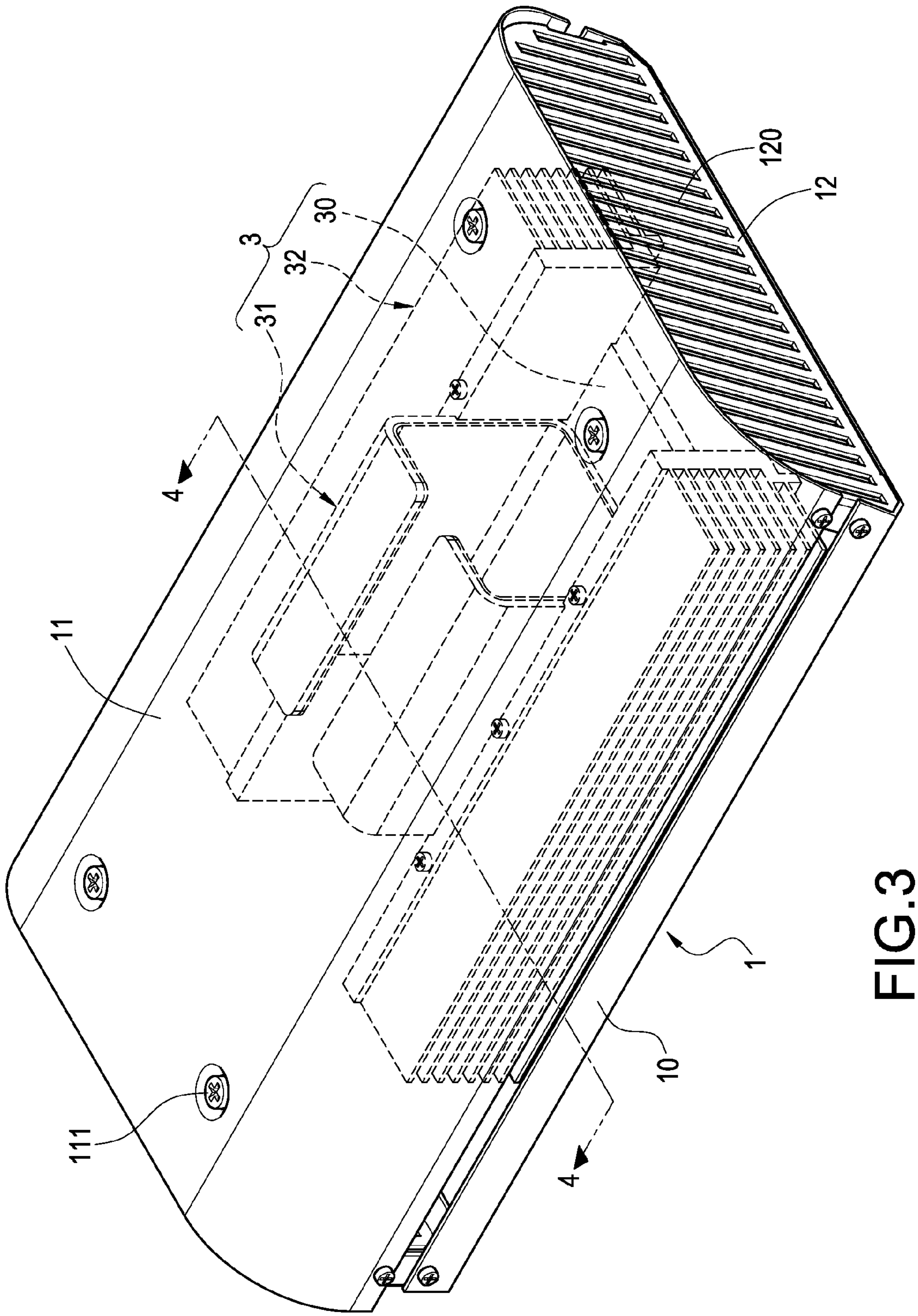
FIG. 3 is a perspective view of the overall structure of the present invention.

With reference to FIGS. 1 to 3 for an exploded view of an internal structure, a perspective view of the internal structure, and a perspective view of the overall structure of the present invention respectively, the present invention provides an LED road lamp holder structure, comprising a lamp guard 1, an LED unit 2, and a heat dissipating device 3. The LED unit 2 is installed at the bottom of the lamp guard 1 for providing illuminations, and the heat dissipating device 3 is installed in the lamp guard 1, attached to the backside of the LED unit 2, and extended towards the top of the lamp guard 1 for conducting heat and providing the required heat dissipating effect for the LED unit 2.

The lamp guard 1 is comprised of a chassis 10 and an upper casing 11, and the LED unit 2 is installed at the bottom of the chassis 10, such that the light source of the LED unit 2 can be projected towards the bottom of the lamp guard 1. A cover plate 12 is formed and erected separately on both left and right sides of the chassis 10, and the slightly curved upper casing 11 is disposed between two cover plates 12, and a plurality of ventilation holes 120 are disposed on the cover plate 12. A stud 100 is erected in the chassis 10, and a screw hole 110 is disposed at a position corresponding to the upper casing 11 for passing a screw 111 and securing the screw 11 into the stud 100 to combine the chassis 10 and the upper casing 11. In addition, a wire tube 13 is installed in the lamp guard 1 and connected to one of the cover plates 12 for installing a power cable (not shown in the figure).

Figure 4:
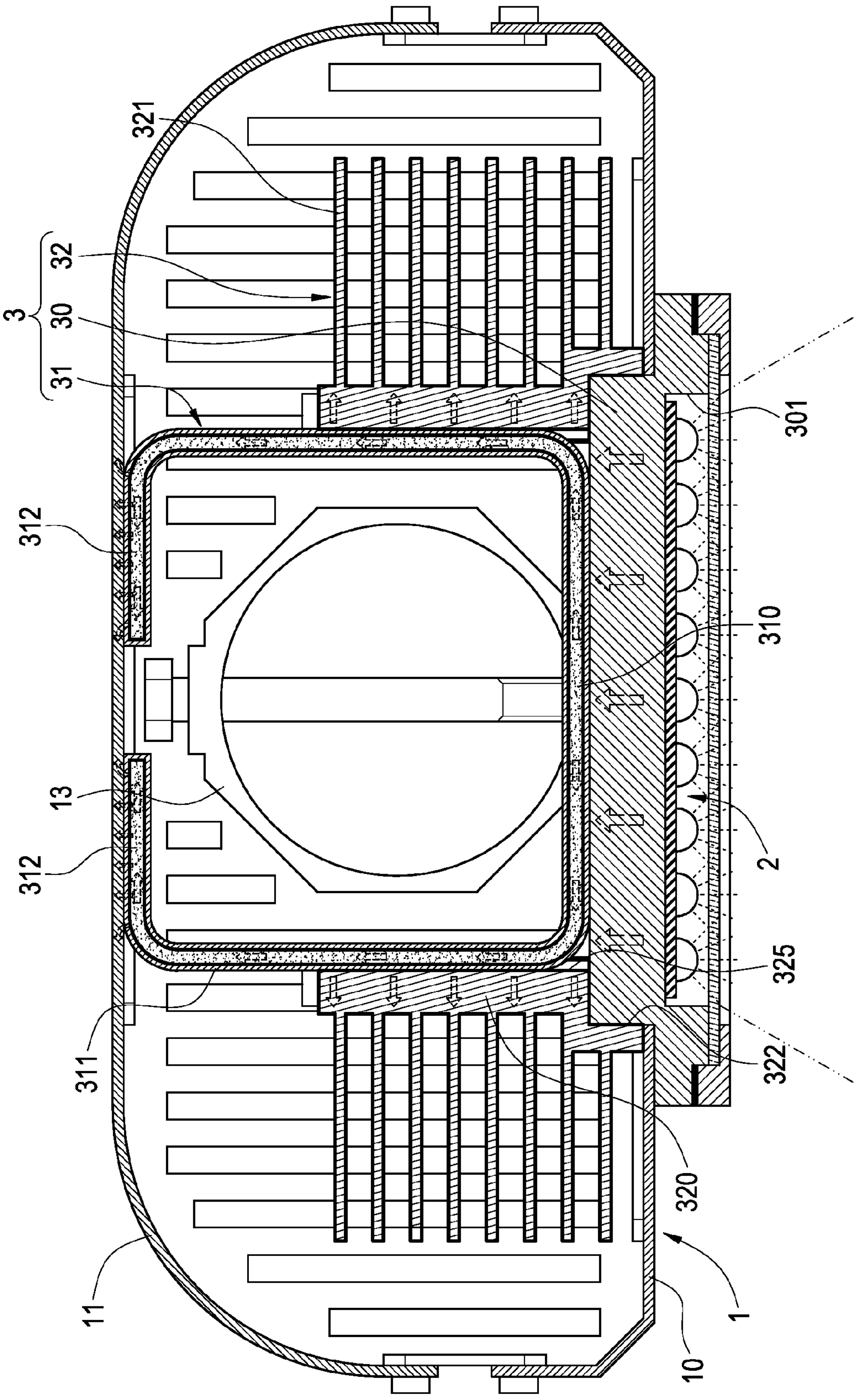
FIG. 4 is a cross-sectional view of Section 4-4 of FIG. 3.

The heat dissipating device 3 is installed in the lamp guard and comprises a base 30, at least one curved vapor chamber 31, and a heat dissipating element 32 disposed separately on both left and right sides of the vapor chamber 31. The base 30 is in the form of a sheet attached on the backside of the LED unit 2 for dissipating heat. The base 30 has a groove 301 disposed at the bottom of the base 30 (as shown in FIG. 4) and provided for embedding and containing the LED unit 2. The vapor chamber 31 is in the form of a long sheet with both ends bent upward along the lengthwise direction to form a heated section 310 attached onto the base 30, and two heat transmitting sections 311 are bent and extended upward from both sides of the heated section 310, and a cooling section 312 is bent and extended laterally from each of the two heat transmitting sections 311. In addition, the two heat dissipating elements 32 can be an aluminum extruded heat sink (as shown in the figure), a stacked heat sink or any other heat sink (not shown in the figure) having a heated base 320, and a plurality of heat dissipating fins 321 are formed on the heated base 320 and arranged with a gap from each other. The two heat dissipating elements 32 are attached onto external sides of the two heat transmitting sections 311 of the vapor chamber 31 by their respective heated base 320, such that each heat dissipating fin 321 is extended from the space sideway to increase the heat dissipating area.

In summation of the description above, each of the two heat dissipating elements 32 has a slot 322 disposed on the heated base 320 and proximate to the bottom of the base 30 for abutting the corners on both sides of base 30, a plurality of through holes 300, 323 for passing the base 30 and the heated base 320, and a screw device 324 such as a bolt for securing the base 30 with the heated base 320. In the meantime, the heated base 320 of the two heat dissipating elements 32 has an embedding groove 325 disposed proximate to an external side of the vapor chamber 31, wherein the embedding groove 325 has a width corresponding to the vapor chamber 31 for installing the vapor chamber 31 between the embedding grooves 325 of the two heat dissipating elements 32.

Figure 5:
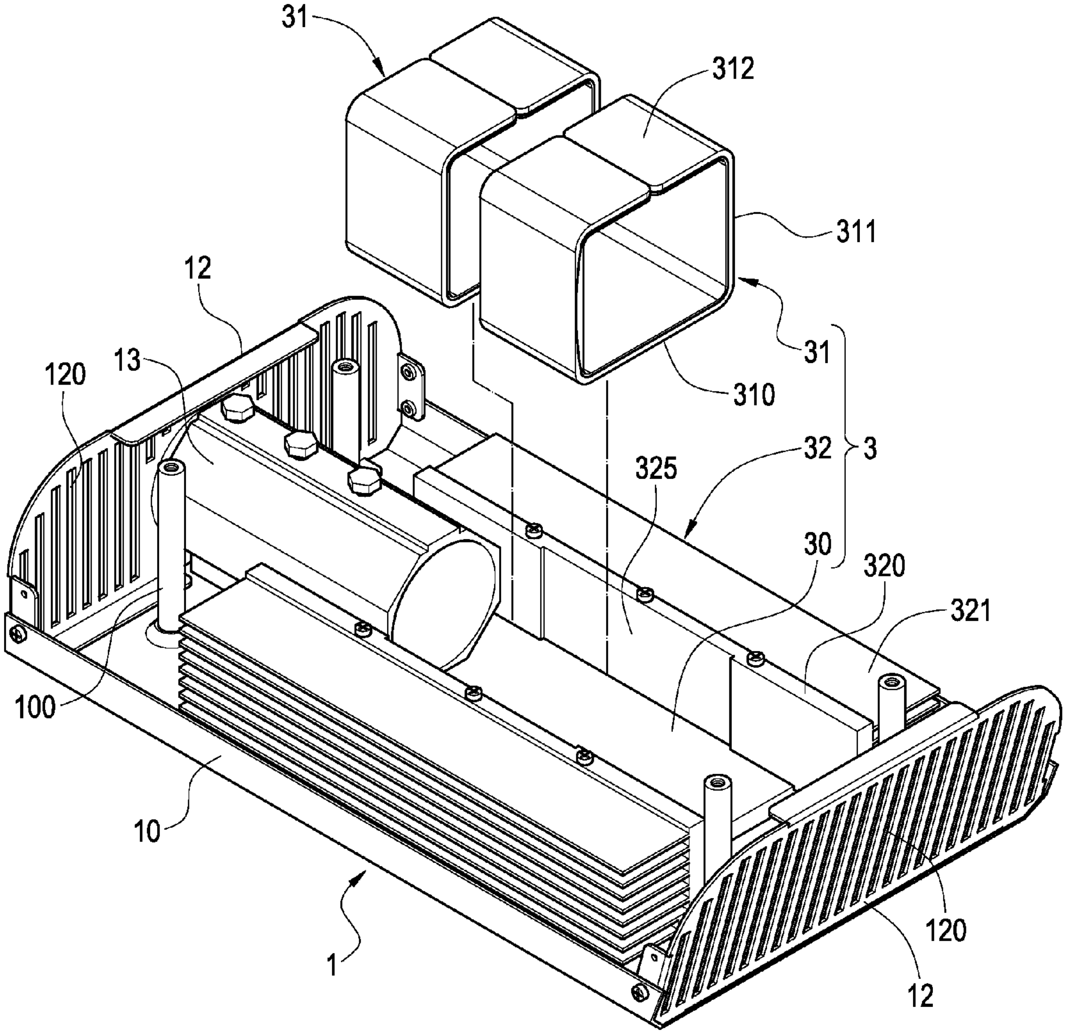
FIG. 5 is a schematic view of the internal structure of another preferred embodiment of the present invention.

In FIGS. 3 and 4, the two condensing sections 312 of the vapor chamber 31 are bent sideway in the same direction with each other (as shown in the figures) or bent sideway in opposite directions with each other (not shown in the figure). In this preferred embodiment, the two condensing sections 312 are not in contact with each other. In the preferred embodiment as shown in FIG. 5, the two condensing sections are disposed corresponding to each other and in contact with each other, and the quantity of vapor chambers 31 is increased to more than one. Most importantly, the two condensing sections 312 of the vapor chamber 31 are extended upward through their respective heat transmitting section 311 and attached onto the internal surface of the upper casing 11 of the lamp guard 1, such that after the base 30 of the heat dissipating device 3 absorbs the heat produced by the LED unit, the vapor chamber 31 will conduct a portion of the heat to the upward direction, and the two heat dissipating elements 32 dissipate another portion of the heat to the outside. The two condensing sections 312 of the vapor chamber 31 are attached onto the internal periphery of the top of the lamp guard 1 for sharing the burden of discharging the remaining heat from the lamp guard 1 to the outside.

Figure 6:
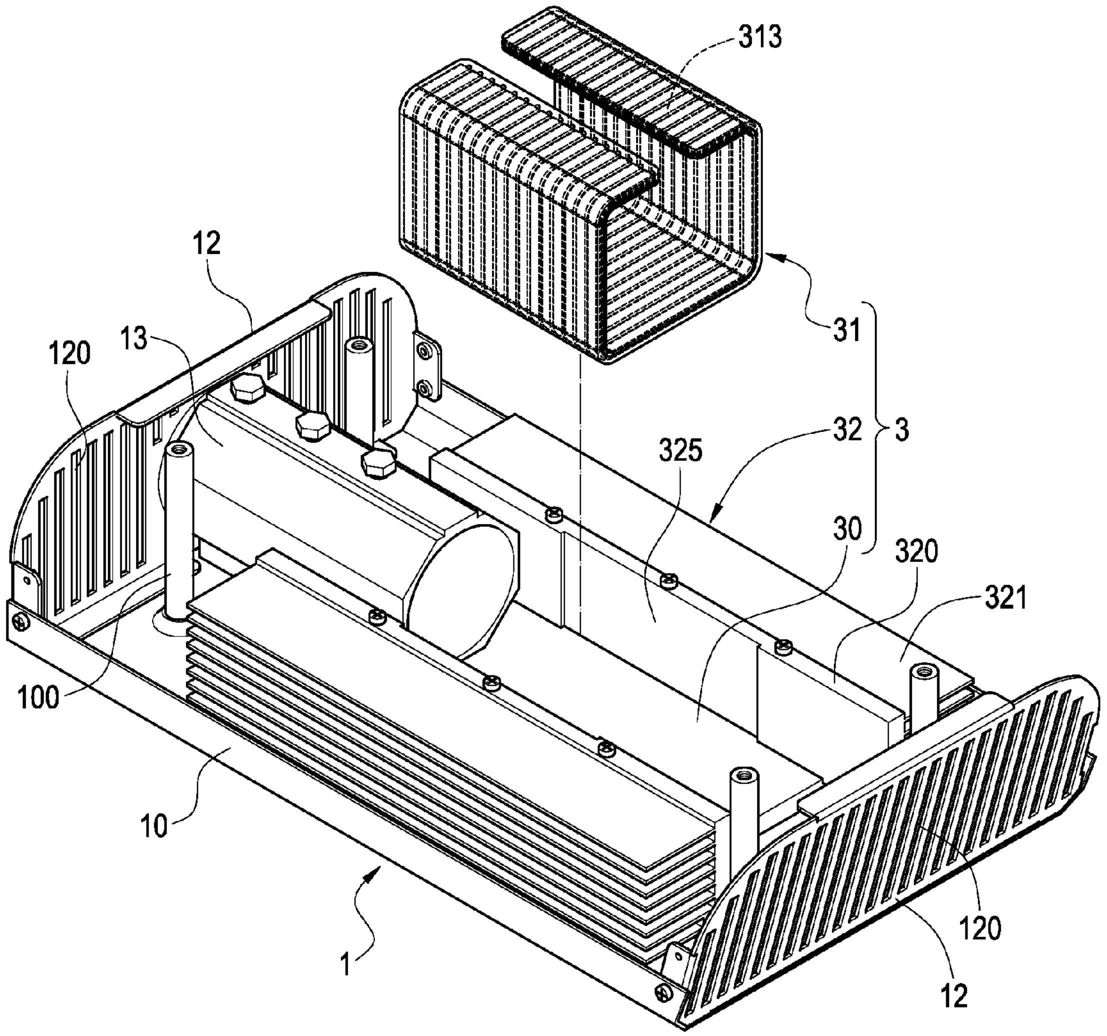
FIG. 6 is a schematic view of the internal structure of a further preferred embodiment of the present invention.

In FIG. 6, the vapor chamber 31 is formed by arranging a plurality of heat pipes 313 closely adjacent with each other.

In summation of the description above, the invention can achieve the expected objectives and overcome the shortcomings of the prior art. The invention complies with the requirements of patent application and is thus duly filed for patent application. While the invention has been described by means of specific embodiments, numerous modifications and variations could be made thereto by those skilled in the art without departing from the scope and spirit of the invention set forth in the claims.

What is claimed is:

1. A light emitting diode (LED) road lamp holder structure, comprising:

a lamp guard (1);

an LED unit (2), installed at the bottom of the lamp guard (1); and a heat dissipating device (30), installed in the lamp guard (1), and comprising:

a base (30), attached onto the LED unit (2);

a vapor chamber (31), having a heated section (310) attached to the base (30), two heat transmitting sections (311) bent and extended upwardly to both sides of the heated section (310) respectively, and a condensing section (312) bent and extended laterally from the two heat transmitting sections (311), and two condensing sections (312) being attached to the internal periphery of the top of the lamp guard (1); and two heat dissipating elements (32), each having a heated base (30), and a plurality of heat dissipating fins (321) disposed on the heated base (30), and two heated bases (30) being attached onto external sides of the two heat transmitting sections (311) respectively, wherein the lamp guard (1) is comprised of a chassis (10) and an upper casing (11), and the LED unit (2) is installed at the bottom of the chassis (10), and the two condensing sections (312) are attached to the internal periphery of the top of the upper casing (11).

2. The LED road lamp holder structure of claim 1, wherein the chassis (10) includes an erected stud (100), a screw hole (110) disposed at a position corresponding to the upper casing (11) for passing a screw (111) and securing the screw (111) into the stud (100) for combining the chassis (10) and the upper casing (11).

3. The LED road lamp holder structure of claim 1, wherein the chassis (10) has a cover plate (12) formed separately at front and rear sides of the chassis (10), and the upper casing (11) is substantially in an arc shape and disposed between the two cover plates (12).

4. The LED road lamp holder structure of claim 3, wherein the two cover plates (12) have a plurality of ventilation holes (120) thereon.

5. The LED road lamp holder structure of claim 1, wherein the base (30) of the heat dissipating device (30) has a groove (301) concavely disposed on the bottom of the base (30), and the LED unit (2) is embedded into the groove (301).

6. The LED road lamp holder structure of claim 1, wherein the vapor chamber (31) has a quantity of more than one.

7. The LED road lamp holder structure of claim 1, wherein the vapor chamber (31) of the heat dissipating device (30) is formed by arranging a plurality of heat pipes (313) adjacent closely with each other.

8. The LED road lamp holder structure of claim 1, wherein the two condensing sections (312) of the vapor chamber (31) of the heat dissipating device (30) are bent sideways and corresponding to each other.

9. The LED road lamp holder structure of claim 8, wherein the two condensing sections (312) are engaged and contacted with each other.

10. A light emitting diode (LED) road lamp holder structure, comprising:

a lamp guard (1);

an LED unit (2), installed at the bottom of the lamp guard (1); and a heat dissipating device (30), installed in the lamp guard (1), and comprising:

a base (30), attached onto the LED unit (2);

a vapor chamber (31), having a heated section (310) attached to the base (30), two heat transmitting sections (311) bent and extended upwardly to both sides of the heated section (310) respectively, and a condensing section (312) bent and extended laterally from the two heat transmitting sections (311), and two condensing sections (312) being attached to the internal periphery of the top of the lamp guard (1); and two heat dissipating elements (32), each having a heated base (30), and a plurality of heat dissipating fins (321)

disposed on the heated base (30), and two heated bases (30) being attached onto external sides of the two heat transmitting sections (311) respectively, wherein each of the two heat dissipating elements (32) of the heat dissipating device (30) has a slot (322) disposed at the heated base (30) and proximate to the bottom of the base (30) for abutting corners on both sides of the base (30).

11. The LED road lamp holder structure of claim 10, wherein the base (30) and the two heated bases (30) have a plurality of through holes (300), (323) disposed thereon, and a screw device (324) for securing the base (30) and the heated base (30).

12. A light emitting diode (LED) road lamp holder structure, comprising:

a lamp guard (1);

an LED unit (2), installed at the bottom of the lamp guard (1); and a heat dissipating device (30), installed in the lamp guard (1), and comprising:

a base (30), attached onto the LED unit (2);

a vapor chamber (31), having a heated section (310) attached to the base (30), two heat transmitting sections (311) bent and extended upwardly to both sides of the heated section (310) respectively, and a condensing section (312) bent and extended laterally from the two heat transmitting sections (311), and two condensing sections (312) being attached to the internal periphery of the top of the lamp guard (1); and two heat dissipating elements (32), each having a heated base (30), and a plurality of heat dissipating fins (321) disposed on the heated base (30), and two heated bases (30) being attached onto external sides of the two heat transmitting sections (311) respectively, wherein the heated base (30) of the two heat dissipating elements (32) of the heat dissipating device (30) has an embedding groove (325) disposed proximate to an external side of the vapor chamber (31), and the embedding groove (325) has a width corresponding to the vapor chamber (31), and the vapor chamber (31) is installed between the embedding grooves (325) of the two heat dissipating elements (32).

* * * * *